United States Patent Office.

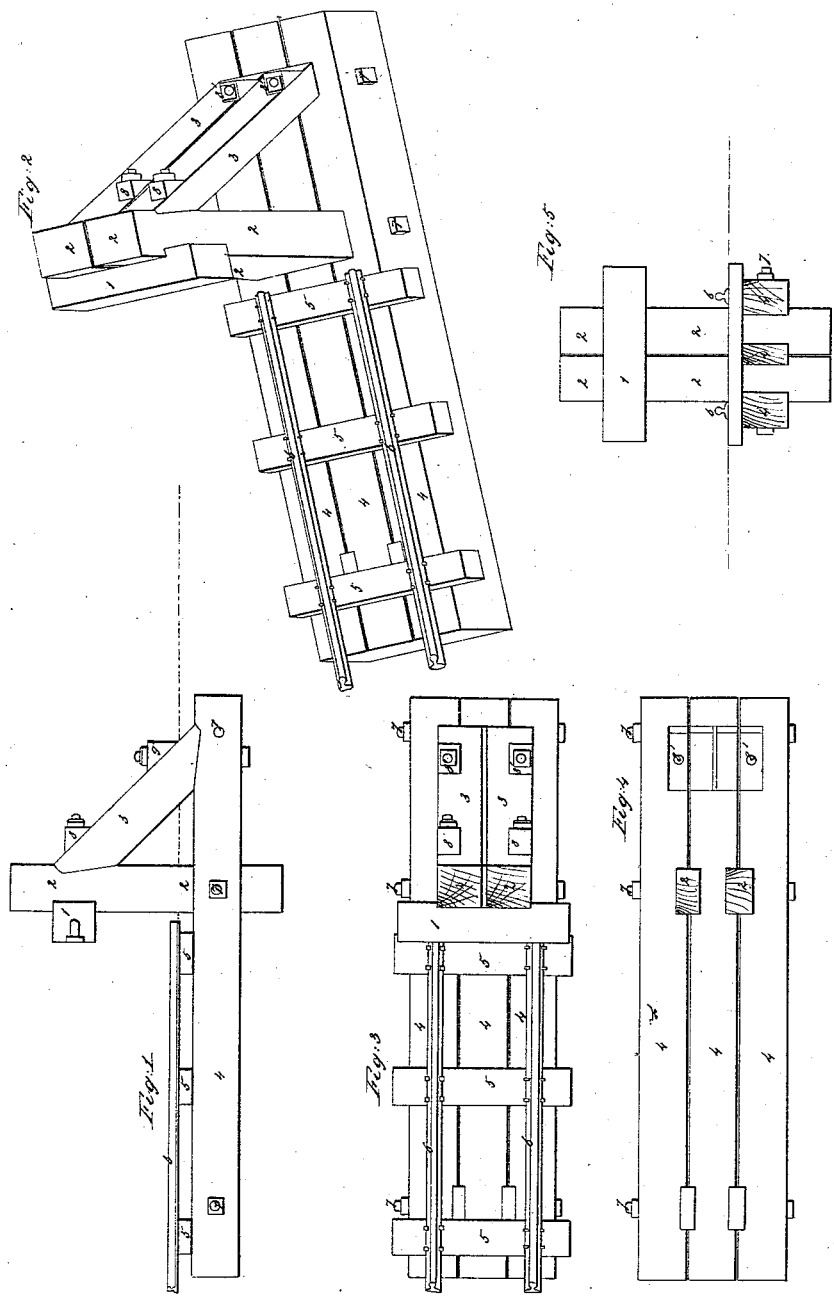

SAMUEL LOVE, OF INDIANAPOLIS, INDIANA.

Letters Patent No. 61,548, dated January 29, 1867.

IMPROVED RAILROAD BUMPING POST.

The Schedule referred to in these Letters Patent and making part of the same.

TO ALL WHOM IT MAY CONCERN:

Be it known that I, SAMUEL LOVE, of Indianapolis, Marion county, State of Indiana, have invented a new and improved "Bumping Post for Cars;" and I do hereby declare that the following is a full, clear, and exact description of the same, reference being had to the accompanying drawings, and the letters of reference marked thereon.

Figure 1 represents the side view.
Figure 2, a perspective view.
Figure 3, a top view.
Figures 4 and 5 represent sections.

The nature of my invention consists in constructing a solid framework composed of the upright timber 2, the trace 3, and the ground sills 4. The bumping timber 1 is mortised into the upright timbers 2, and bolted to it through the bumping timber 1, the upright 2, and the brace 3, by means of the bolt 8'. The brace 3 is notched or framed into the upright timbers 2, and also into the ground sills 4, and bolted, by means of a bolt, 8', to the ground sills 4. The ground sills 4 are framed around the upright 2, as shown in figs. 4 and 5, and extend into the ground a couple of feet. The ground sills are bolted together every ten feet. The ties 5 5 5 are laid on top of the ground sills, which project opposite the brace 3, and are calculated to be placed under ground so as to run the car on to them, and by its own weight prevent the strongly framed and braced upright 2 from giving away when the car pushes against it, or from raising out of the ground. The red lines on drawings represent the surface line of ground, and will show about four feet of timber to be under ground.

What I claim, and desire to secure by Letters Patent of the United States, is—

The arrangement of the ground sills 4 4 in relation to the bumping post, its timbers, and braces 1 2 3, in such a manner so that the ground sills shall extend under the railroad track, receiving thereupon the weight of the car, in the manner and for the purpose herein set forth.

SAMUEL LOVE.

Witnesses:
JNO. L. SMITHMYER,
HENRY R. HUEBNER.